Feb. 17, 1959 H. ZIFF Re. 24,600
INSULATED BAG
Original Filed Sept. 23, 1957
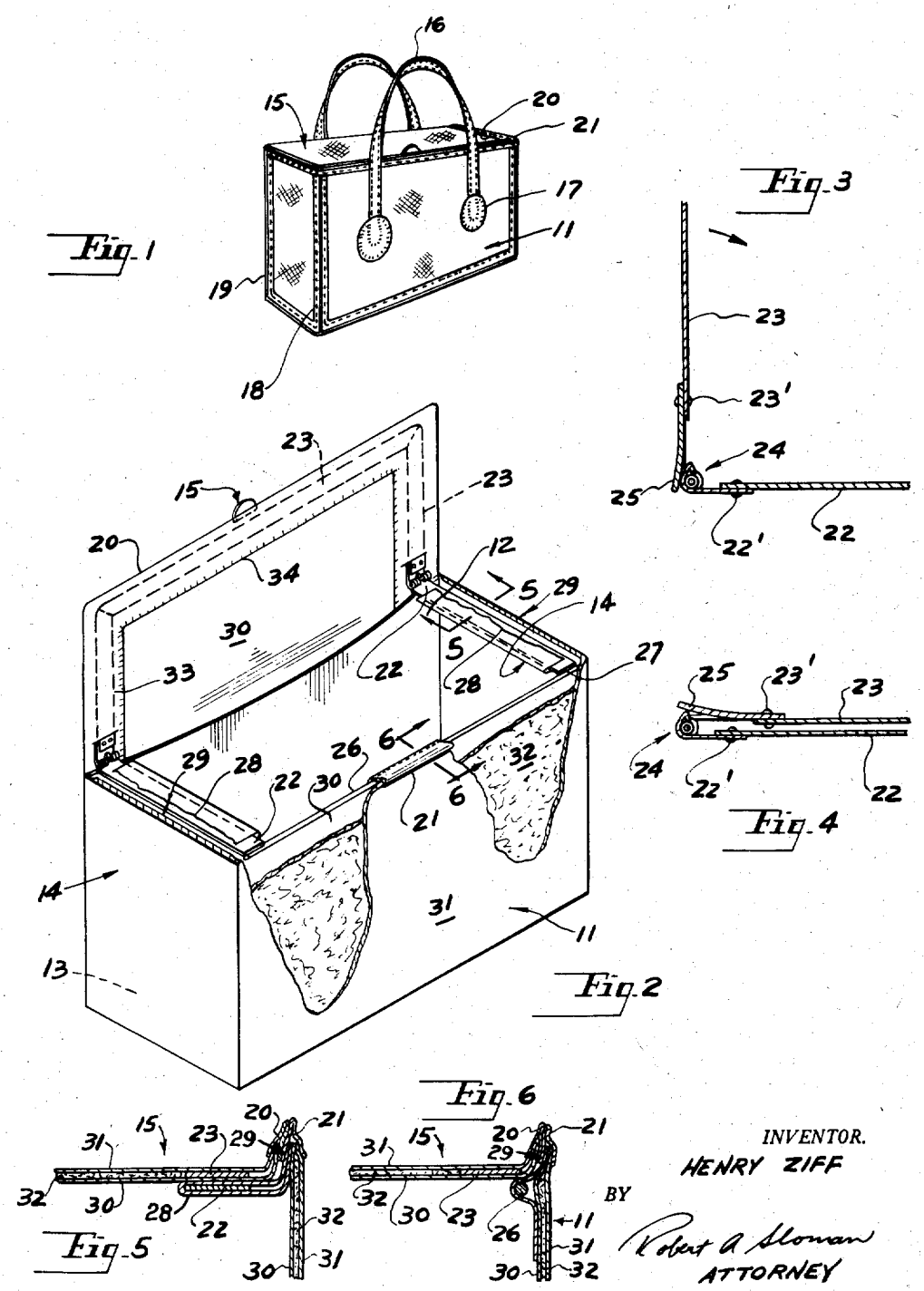
INVENTOR.
HENRY ZIFF
BY
Robert A Sloman
ATTORNEY United States Patent Office Re. 24,600
Reissued Feb. 17, 1959

24,600

INSULATED BAG

Henry Ziff, Detroit, Mich.

Original No. 2,857,949, dated October 28, 1958, Serial No. 685,735, September 23, 1957. Application for reissue November 19, 1958, Serial No. 775,088

4 Claims. (Cl. 150—52)

Matter enclosed in heavy brackets [ ] appears in the original patent but forms no part of this reissue specification; matter printed in italics indicates the additions made by reissue.

This invention relates to an insulated carrying case and more particularly to a novel insulated case with cooperating means for sealing the same closed.

It is the object of the present invention to provide in an insulated carrying case a cover supporting ledge on the interior thereof below its upper open end adapted to sealingly receive the cover.

It is the further object herein to provide a horizontally disposed U-shaped reinforcing frame for the upper open end of the case and hinged thereto a U-shaped reinforcing frame for the cover whereby upon closing of the cover down into the open upper end of the case, the said frames will be brought into juxtaposition.

It is the further object of this invention to provide in conjunction with the hinge between said frames suitable spring means adapted to resiliently bias the cover into closed position whenever said cover is at an angle less than 45 degrees to the horizontal and to resiliently bias said cover into an upright open position whenever the cover is at an angle less than 45 degrees to a vertical plane.

It is a further object of the present invention to provide a cover receiving ledge below the upper open end of the case and cooperating beading upon the margins of the case and the cover adapted for cooperating engaging and sealing relation.

These and other objects will be seen from the following specification and claims in conjunction with the appended drawing in which:

Fig. 1 is a perspective view of the present insulated carrying case.

Fig. 2 is a fragmentary perspective view broken away with the cover in open position.

Fig. 3 is a fragmentary elevational section showing the relation between the case and cover frames and their connections corresponding to Fig. 2.

Fig. 4 is an elevational section showing the relationship of said frames when the cover is closed.

Fig. 5 is a fragmentary section taken on line 5—5 of Fig. 2, but on an enlarged scale.

Fig. 6 is a fragmentary section taken on line 6—6 of Fig. 2, but on an enlarged scale.

It will be understood that the above drawing illustrates merely a preferred embodiment of the invention and that other embodiments are contemplated within the scope of the claims hereafter set forth.

Referring to the drawing, the present insulated carrying case includes the upright front and rear walls 11 and 12, bottom wall 13 and upright end walls 14 which provide an open end for said case adapted to cooperatively receive the rectangular cover 15 which forms an extension of and is connected to rear wall 12.

A pair of inverted U-shaped flexible handles 16 are arranged upon the front and rear walls and respectively secured thereon at their ends at points 17.

The upright U-shaped beading 18 and 19 extends along and interconnects the edges of the front and rear walls with corresponding edge portions of the end walls. At the same time said beading interconnects bottom portions of the front and rear walls with bottom wall 13.

The continuous beading 20 extends around the free edges of cover 15 and projects laterally outward and slightly upward thereof as shown in Figs. 5 and 6.

Said beading 20 is adapted to cooperatively and sealingly engage within the interior of the horizontally disposed flexible beading 21 which extends around the three open sides of the case as best illustrated in Figs. 5 and 6.

There is provided within the case and spaced below its upper open end a ledge which cooperatively receives marginal portions of cover 15 when it is closed to a horizontal position as shown in Figs. 1, 5 and 6.

Said ledge is defined by the horizontally disposed U-shaped casing frame which is metallic and which includes the relatively wide elongated straps 22 which are arranged upon the interiors of end walls 14 below their upper ends.

The case frame also includes interconnecting rod 26 secured to the ends of frame elements 22 as by welding at points 27, Fig. 2. The frame elements 22 are covered by material 28 forming a part of the end walls of the case and thereby partly defining the cover receiving ledges as best illustrated in Figs. 2, 5 and 6.

The marginal beading 21 on the case defines with upper portions of the ledge elements 28 and with upper portions of lining 30 of front wall 11, the upstanding edge portions 29 forming a part of the case and within which the cover is nested when closed. The rod 26 bears against the interior surface of front wall 11 and is suitably secured thereto spaced below its upper edge.

There is provided a U-shaped reinforcing frame 23 which is metallic and which is relatively wide for cooperative juxtaposition with casing frame 22—26 when the cover is in closed position.

Cover frame 23 is arranged adjacent to but inwardly of the outer margins of cover 15 and retained with respect thereto by means of the additional strip of material 33 which is suitably welded by heat and pressure along its margin as at 34 to the surface of lining 30, which is preferably of a plastic material such as polyethylene or the like. This lining extends throughout the interior of the case and the interior of the cover.

The case walls, and including the cover has an outer preferably plastic layer 31 of similar plastic material and interposed between said layers is a layer of insulating material 32 of jute or glass wool or equivalent insulator, to thereby complete the said walls and cover for the carrying case.

As shown in Fig. 3, the free ends of the case frame 22—26 are joined by rivets 22' to the common hinge 24 which also connects by rivets 23' the free ends of cover frame 23. The hinge 24 includes the resilient means 25 which is adapted to bias cover 15 to the closed and sealed position whenever the cover is left open less than a 45-degree angle to the horizontal. Said resilient means is also adapted to bias the cover to fully open upright position whenever the cover is at a position less than 45 degrees to the vertical.

Having described my invention, reference should now be had to the claims which follow:

I claim:

1. In an insulated carrying case having front, rear, end and bottom walls, a horizontally disposed U-shaped reinforcing frame interposed between the end walls and against the front wall upon their interiors, spaced below their upper ends and secured thereto, said frame [being covered with material forming a part of said walls and] defining a cover supporting and sealing ledge below the open end of said case, a cover forming an extension of said rear wall and connected thereto, frame elements secured within the outer margins of said cover inwardly of its edges with the free ends of the cover frame elements hingedly connected to the free ends of the case frame, and spring means forming a part of said hinge connection adapted to resiliently bias the cover to closed position on said ledge when it is open less than 45 degrees to the horizontal and bias the cover to an upright open position when it is open less than 45 degrees to the vertical.

2. In the case of claim 1, the ends of the case frame being flat and relatively wide, the central portion of the case frame being in the form of a rod, the cover frame elements being flattened and relatively wide whereby or closing the cover said frame and frame elements are in close sealing juxtaposition below the open end of said case and the corresponding margins of said cover and open end of the case are in substantially upright engaging and sealing relation.

3. In the case of claim 1, a horizontally disposed U-shaped flexible beading extending around the open end of said case arranged above said ledge, a continuous flexible beading extending around the free edges of the cover and projecting laterally and upwardly thereof adapted for partial nesting within said case beading in substantially air sealing relation therewith.

4. The carrying case of claim 1, same frame elements being in the form of a U.

References Cited in the file of this patent or the original patent

UNITED STATES PATENTS

| | | |
|---|---|---|
| 2,123,031 | Weiner | July 5, 1938 |
| 2,289,254 | Eagles | July 7, 1942 |
| 2,661,785 | Daust | Dec. 8, 1953 |
| 2,667,198 | Klein | Jan. 26, 1954 |
| 2,795,258 | Berry et al. | June 11, 1957 |